United States Patent
Kulkarni et al.

(10) Patent No.: US 10,002,330 B2
(45) Date of Patent: Jun. 19, 2018

(54) CONTEXT BASED CO-OPERATIVE LEARNING SYSTEM AND METHOD FOR REPRESENTING THEMATIC RELATIONSHIPS

(71) Applicant: Parag Arun Kulkarni, Pune OT (IN)

(72) Inventors: Parag Arun Kulkarni, Pune (IN); Santosh Dwivedi, Kanpur (IN); Yashodhara V. Haribhakta, Pune (IN)

(73) Assignee: Parag Kulkarni, Pune (IN)

(*) Notice: Subject to any disclaimer, the term of this patent is extended or adjusted under 35 U.S.C. 154(b) by 646 days.

(21) Appl. No.: 14/676,680

(22) Filed: Apr. 1, 2015

(65) Prior Publication Data
US 2015/0206070 A1 Jul. 23, 2015

Related U.S. Application Data

(63) Continuation of application No. PCT/IN2013/000599, filed on Oct. 1, 2013.

(30) Foreign Application Priority Data

Oct. 1, 2012 (IN) .......................... 2893/MUM/2012

(51) Int. Cl.
*G06N 99/00* (2010.01)
*G06F 17/30* (2006.01)

(52) U.S. Cl.
CPC ....... *G06N 99/005* (2013.01); *G06F 17/3053* (2013.01); *G06F 17/30336* (2013.01); *G06F 17/30598* (2013.01)

(58) Field of Classification Search
None
See application file for complete search history.

(56) References Cited

U.S. PATENT DOCUMENTS 6,182,066 B1 * 1/2001 Marques .......... G06F 17/30867
2002/0194161 A1 12/2002 McNamee
(Continued)

FOREIGN PATENT DOCUMENTS

| CN | 1766871 | 5/2006 |
|---|---|---|
| CN | 101395600 | 3/2009 |

(Continued)

OTHER PUBLICATIONS

International Search Report in corresponding International Application PCT/IN/2013/000599, WIPO, dated Apr. 3, 2014.
(Continued)

*Primary Examiner* — Paulinho E Smith
(74) *Attorney, Agent, or Firm* — Ryan Alley IP

(57) ABSTRACT

Systems and methods progressively or heuristically associate themes amongst plural objects in a computer setting. Objects, including files, modules, programs, data, and the like can be arranged in a population by their association with a particular theme and user-input context. Based on input search parameters and associations, the objects can be progressively matched with appropriate context and returned in more relevant searches. Themes and context for individual objects can be individually determined based on semantic input and well as meta data associated with the objects. Objects can be returned based on search criteria in rank order according to their association. Systems and methods are useable or organization of objects in Internet searches, document searches and collation, document and content visual representation, database management, polling systems, and document management systems.

20 Claims, 7 Drawing Sheets

(56) References Cited

U.S. PATENT DOCUMENTS

| | | | |
|---|---|---|---|
| 2006/0184481 A1* | 8/2006 | Zhang | G06F 17/30616 |
| | | | 706/45 |
| 2007/0203869 A1 | 8/2007 | Ramsey et al. | |
| 2011/0252045 A1 | 10/2011 | Garg | |
| 2014/0075004 A1* | 3/2014 | Van Dusen | H04L 41/04 |
| | | | 709/223 |
| 2015/0106078 A1* | 4/2015 | Chang | G06F 17/30705 |
| | | | 704/9 |
| 2015/0106156 A1* | 4/2015 | Chang | G06Q 30/0201 |
| | | | 705/7.29 |
| 2015/0106157 A1* | 4/2015 | Chang | G06Q 30/0201 |
| | | | 705/7.29 |
| 2015/0206070 A1* | 7/2015 | Kulkarni | G06N 99/005 |
| | | | 706/12 |
| 2015/0294220 A1* | 10/2015 | Oreif | G06N 5/04 |
| | | | 706/12 |
| 2016/0078022 A1* | 3/2016 | Lisuk | G06F 3/04842 |
| | | | 706/12 |
| 2017/0235848 A1* | 8/2017 | Van Dusen | G06F 17/30979 |
| | | | 705/12 |

FOREIGN PATENT DOCUMENTS

| | | | | |
|---|---|---|---|---|
| CN | 102402539 | | 4/2012 | |
| WO | WO-2007050646 A2 * | | 5/2007 | G06Q 10/00 |

OTHER PUBLICATIONS

Written Opinion in corresponding International Application PCT/IN2013/000599, WIPO, dated Apr. 3, 2014.

* cited by examiner

CONTEXT BASED CO-OPERATIVE LEARNING SYSTEM AND METHOD FOR REPRESENTING THEMATIC RELATIONSHIPS

RELATED APPLICATIONS

This application claims priority under 35 U.S.C. § 120 to, and is a continuation of, co-pending International Application PCT/IN2013/000599, filed Oct. 1, 2013 and designating the US, which claims priority to Indian Application 2893/MUM/2012, filed Oct. 1, 2013, such Indian Application also being claimed priority to under 35 U.S.C. § 119. These Indian and International applications are incorporated by reference herein in their entireties.

FIELD

This invention relates to the field of information systems, computational systems, and databases.

Additionally, this invention relates to search systems, rankings systems, assessing systems, organizing systems, relational systems, and the like.

Additionally, this invention relates to machine learning systems, knowledge representation systems, data representation systems, and decision making systems.

Specifically, this invention relates, in general, to searching objects, ranking one or more objects and, in particular, to methods and apparatus for relating, assessing, ranking, organizing, and presenting object relationships associated with a theme and user context.

More specifically, this invention relates to context based co-operative learning system and method for representing thematic relationships.

BACKGROUND

The Internet is a global system of interconnected computer networks that use the standard Internet protocol suite (often called TCP/IP, although not all applications use TCP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email.

The World Wide Web (or Internet), is a system of inter-linked hypertext documents accessed via the Internet. With a web browser, one can view web pages that may contain text, images, videos, and other multimedia, and navigate between them via hyperlinks.

The terms Internet and World Wide Web are often used in everyday speech without much distinction. However, the Internet is a global system of interconnected computer networks and, in contrast, the Web is one of the services that runs on the Internet. It is a collection of text documents and other resources, linked by hyperlinks and URLs, usually accessed by web browsers from web servers. In short, the Web can be thought of as an application "running" on the Internet.

Viewing a web page on the World Wide Web normally begins either by typing the URL of the page into a web browser or by following a hyperlink to that page or resource. The web browser then initiates a series of communication messages, behind the scenes, in order to fetch and display it.

'Searching' on the Internet or through the web involves inputting a search parameter, and further involves the steps of processing the search parameters against the repository of web pages and their contents and the final step of showing those results through a web browser. Searching involves the use of search engines developed and deployed for the purpose mentioned above.

A web search engine is designed to search for information on the World Wide Web. The search results are generally presented in a line of results often referred to as search engine results pages (SERPs). The information may be embedded in web pages, images, information and other types of files. Some search engines also mine data available in databases or open directories. Unlike web directories, which are maintained only by human editors, search engines also maintain real-time information by running an algorithm on a web crawler.

A Web crawler is a computer program that browses the World Wide Web in a methodical, automated manner or in an orderly fashion.

A search engine operates in the following order:
Web crawling
Indexing
Searching Web search engines work by storing information about many web pages, which they retrieve from the HTML itself. These pages are retrieved by a Web crawler (sometimes also known as a spider)—an automated Web browser which follows every link on the site. The contents of each page are then analyzed to determine how it should be indexed (for example, words can be extracted from the titles, page content, headings, or special fields called meta tags). Data about web pages are stored in an index database for use in later queries. A query can be a single word. The purpose of an index is to allow information to be found as quickly as possible. Some search engines, such as Google, store all or part of the source page (referred to as a cache) as well as information about the web pages, whereas others, such as AltaVista, store every word of every page they find. This cached page always holds the actual search text since it is the one that was actually indexed, so it can be very useful when the content of the current page has been updated and the search terms are no longer in it.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. Most search engines support the use of the boolean operators AND, OR and NOT to further specify the search query. Boolean operators are for literal searches that allow the user to refine and extend the terms of the search. The engine looks for the words or phrases exactly as entered. Some search engines provide an advanced feature called proximity search which allows users to define the distance between keywords. There is also concept-based searching where the research involves using statistical analysis on pages containing the words or phrases you search for. As well, natural language queries allow the user to type a question in the same form one would ask it to a human. A site like this would be ask.com or chacha.com The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another. The methods also change over time as Internet usage changes and new techniques evolve. There are two main types of search engine that have evolved: one is a system of predefined and hierarchically ordered keywords that humans have programmed extensively. The other is a system that generates an "inverted index" by analyzing texts it locates. This second form relies much more heavily on the computer itself to do the bulk of the work.

SUMMARY

For the purposes of this invention, the term, "object" refers to documents, images, textual content, text files, videos, multimedia content, files, folders, and the like searchable content. Traditionally, all of these are searchable on the Internet through search engines.

For the purposes of this invention, the term, "context" refers to user perspective or user inputs or learning from a user or any activity in relation to a user profile or user, directly. Context may be place, situation, meta data, and scenario along with association.

For the purposes of this invention, the term, "theme" refers to database perspective which is pre-defined and pre-populated and probably classified. Theme is a perspective based association with reference to objective.

For the purposes of this invention, the term, "topic" refers to a situation or event in relation to user perspective or system perspective. Topic is a perspective based associated with reference to objective.

According to one embodiment, one context may have multiple themes or multiple topics.

According to this invention, there is provided a system and method comprising the step(s) of data coming from various sources; with ability of co-operative learning allowing to build context; and has ability to search in repository of objects like documents (but not limited to documents) based on context with reference to theme. Further can able to represent thematic relationships and closeness among one or more objects.

Typically, the system and method allows context driven co-operative methodology allows to determine the contextual relationships between features typically words and word phrases in case of documents building overall context for objects or documents and ranking them with reference to user context.

Typically, the system and method allows to learn co-operatively with reference to more than one source of information and disambiguate to build systemic context.

Typically, the system and method finds out contextual relationship between/among two or more objects and can rank them with reference to any predefined object.

Typically, the system and method further ranks individual entities and extract them.

Typically, the system and method helps in thematic representation of context and it allows searching with reference to user context.

Typically, the system and method comprises context determination means which further comprises processor and memory coupled processor. The information is requested from client along with meta data with objects are used to determine the context. The context represented like a thematic relationship. It has ability to refine the existing object classes and evolve a new class if necessary with reference to context.

According to this invention, there is provided a context based co-operative learning system comprising:

identifier means adapted to identify and index objects in accordance with pre-determined parameters of identification and indexing;

context determination mechanism adapted to define parameters of identification in order to determine context topic and/or context theme of the objects based on identifiable features of the objects;

information sources' gathering means adapted to gather sources of information in relation to or with reference to the identified objects;

searching means adapted to search for the objects, in response to at least a user query, within the determined context topic and/or the determined context theme;

cluster data building mechanism adapted to build clusters of relevant objects and further adapted to build at least a cluster library based on pre-defined parameters of clustering the clusters;

context mapping means adapted to map at least a context of the query for the searching means with the clusters from the cluster library to segregate and poll the objects in response to the search query in line with at least a determined context topic and/or the determined context theme; and co-operative learning means adapted to allow multiple systems to co-operatively learn from each other based on determined context topic and/or determined context theme.

Typically, the identifier means is adapted to identify and index objects in accordance with pre-determined parameters of identification and indexing, characterized, in that, the pre-determined parameters comprises data, meta data, meta tags, and the like identifiable features of the objects.

Typically, the identifier means is adapted to identify and index objects in accordance with pre-determined parameters of identification and indexing, characterized, in that, the identifier means comprises:

key features' identification mechanism adapted to identify key features in the objects, which key features relate to a topic; and relationship identification mechanism adapted to identify relationships among identified key topic-based features per object.

Additionally, the identifier means is adapted to identify and index objects in accordance with pre-determined parameters of identification and indexing, characterized, in that, the identifier means comprises:

establishing means adapted to establish contextual/thematic features for the objects;

key features' identification mechanism adapted to identify key features in the objects, which key features relate to a theme;

relationship identification mechanism adapted to identify relationships among identified key thematic features per object.

Typically, the co-operative learning means is a systemic and iterative machine learning means.

Typically, the co-operative learning means comprises:

cluster data building mechanism adapted to build clusters of relevant objects and further adapted to build at least a cluster library based on pre-defined parameters of clustering the clusters;

context mapping means adapted to map at least a context of the query for the searching means with the clusters from the cluster library to segregate and poll the objects in response to the search query in line with at least a determined topic; characterised, in that, the pre-defined parameters of clustering being associated with pre-determined factors comprising likelihood factors, statistical factors, and closeness factors.

Additionally, the co-operative learning means comprises:

cluster data building mechanism adapted to build clusters of relevant objects and further adapted to build at least a cluster library based on pre-defined parameters of clustering the clusters;

context mapping means adapted to map at least a context of the query for the searching means with the clusters from the cluster library to segregate and poll the objects in response to the search query in line with at least a determined topic; characterised, in that, the pre-defined parameters of clustering being associated with identification of multiple clusters having similar behaviour.

Additionally, the co-operative learning means comprises:

cluster data building mechanism adapted to build clusters of relevant objects and further adapted to build at least a cluster library based on pre-defined parameters of clustering the clusters;

context mapping means adapted to map at least a context of the query for the searching means with the clusters from the cluster library to segregate and poll the objects in response to the search query in line with at least a determined theme; characterised, in that, the pre-defined parameters of clustering being associated with pre-determined factors comprising likelihood factors, statistical factors, and closeness factors.

Additionally, the co-operative learning means comprises:

cluster data building mechanism adapted to build clusters of relevant objects and further adapted to build at least a cluster library based on pre-defined parameters of clustering the clusters;

context mapping means adapted to map at least a context of the query for the searching means with the clusters from the cluster library to segregate and poll the objects in response to the search query in line with at least a determined theme; characterised, in that, the pre-defined parameters of clustering being associated with identification of multiple clusters having similar behaviour.

Additionally, the co-operative learning means comprises:

context mapping means adapted to map the association of the query in terms of document context and/or user context and/or scenario context such that determination of document context and/or user context and/or scenario context being enabled by pre-determined factors such as likelihood factors, statistical factors, and closeness factors.

Additionally, the co-operative learning means comprises:

sharing mechanism to share determined topic and determine theme in order to allow systems to learn with multiple perspectives;

feature vectors' building mechanism to allow intelligent systems to build feature vectors based on the pre-determined parameters of identification and indexing;

association mechanism adapted to associate the built feature vectors with probabilistic weight assignment in order to build representative feature vectors; and statistical mechanism adapted to statistically build weights using multi-level a priori and advanced bias based likelihood algorithm.

Typically, the context determination means comprises semantic determination mechanism adapted to determine context (and content) based on semantic processing of the identified objects based on the identifiable features of the identified objects.

Typically, the context determination means comprises syntactic determination mechanism adapted to determine context (and content) based on syntactic processing of the identified objects based on the identifiable features of the identified objects.

Typically, the context determination means comprises topic determination mechanism adapted to determine context topic based on topic-based processing of the identified objects based on the identifiable features of the identified objects.

Typically, the context determination mechanism comprises topic determination mechanism adapted to determine at least a topic that is a representative context of textual content of the identified objects.

Typically, the context determination mechanism comprises topic determination mechanism adapted to determine at least a topic based on at least one of the following:

association among key phrases that leads to a context;

occurrence of bigrams, trigrams, relationship and occurrence of key words and phrases; and relation extraction between the occurrences.

Typically, the context determination mechanism comprises theme determination mechanism adapted to determine at least a theme based on at least one of the following:

association among key phrases that leads to a context;

occurrence of bigrams, trigrams, relationship and occurrence of key words and phrases; and relation extraction between the occurrences.

Typically, the context determination mechanism comprises topic determination mechanism adapted to determine at least a topic based on the following extracted parameters from a set of identified objects from at least one of the following:

Top frequency unigrams;

Top frequency bigrams;

Longer key phrases;

Association among frequently occurring unigrams and frequently occurring bigrams;

Corpus of frequent objects and their statistical association leading to most relevant pre-known topics;

Likelihood and reinforcement learning mechanisms in order to learn a new topic if there is no pre-known relevant topic;

Semi-supervised learning mechanisms in order to learn a new topic; and

Mapping of key phrases to a pre-known or learnt topic.

Typically, the context determination means comprises thematic determination mechanism adapted to determine context theme based on thematic processing of the identified objects based identifiable features of the identified objects.

Typically, the context determination means comprises thematic determination mechanism adapted to determine at least a theme based on at least one of the following extracted parameters from a set of identified objects:

local score of words that is computed;

global score of words, that is computed, based on similarity, sentence score, that is computed, based on local score, global score, and normalization; and situation representing primary context.

Typically, the context determination mechanism comprises contextual features inference mechanism adapted to infer contextual features for each of the objects, D;

$$Di=\{Pi,Ti,Si,Oi\} \ldots 0<i<n$$

where,
1. n=no. of doc in class
2. Ti=set of temporal features
3. Si=set of spatial features
4. Pi=set of protagonist features
Oi=set of organizational features Typically, the context determination mechanism comprises contextual features inference mechanism adapted to infer contextual features for each of the objects, D;

$$Di=\{Pi,Ti,Si,Oi\} \ldots 0<i<n$$

where,
1. n=no. of doc in class
2. Ti=set of temporal features
3. Si=set of spatial features
4. Pi=set of protagonist features
Oi=set of organizational features characterized, in that, the context determination further comprises clustering mechanism adapted to cluster the inferred features of the objects for a class in to at least the following the four situation vectors:

Ti=$\{t0, t1, t2, \ldots tn\}$ for temporal features of the class i.
Si=$\{s0, s1, s2, \ldots sn\}$ for spatial features of the class i.
Pi=$\{p0, p1, p2, \ldots pn\}$ for protagonist features of the class i.
Oi=$\{o0, o1, o2, \ldots n\}$ for organizational features of the class i.

wherein, the situation vectors, which define a theme, are generated for each class, the situation vectors form at least a situation model/thematic model for that category:

$$CSj=\{Tj,Sj,Pj,Oj\} \ldots j=1 \text{ to } C$$

where,
2. C=no. of categories
3. Tj=$\{t0, t1, t2, \ldots, tk\}$
4. Sj=$\{s0, s1, s2, \ldots, sk\}$
5. Pj=$\{p0, p1, p2, \ldots, pk\}$
6. Oj=$\{o0, o1, o2, \ldots, ok\}$ Typically, the context determination mechanism comprises thematic relationship establishment means adapted to establish a theme during the use of the system for searching, the theme being established based on at least one of the parameters comprising user profile, scenario, and knowledge base.

Additionally, the context determination mechanism comprises thematic relationship determination means adapted to determine a thematic relationship between the objects.

Typically, the system comprises a user input means or a user and information context defining means adapted to allow a user to input data for topic determination or identification, thereby allowing the system to form a cluster of objects, based on the topic, to be searched or retrieved.

Typically, the system comprises a user input means or a user and information context defining means adapted to allow a user to input data for theme determination or identification, thereby allowing the system to form a cluster of objects, based on the theme, to be searched or retrieved.

Typically, the system comprises classification means adapted to classify a user profile accessing the system and the searching means.

Typically, the system comprises context based learning means adapted to allow the system to learn a context from the at least a user query and corresponding output search result, the context based learning means being an iterative learning mechanism and involving results based on pre-identified topic defined by the system.

Additionally, the system comprises context based learning means adapted to allow the system to learn a context from the at least a user query and corresponding output search result, the context based learning means being an iterative learning mechanism and involving results based on pre-identified themes defined by the system.

Typically, the information sources' gathering means is a theme based information sources' gathering means.

Additionally, the information sources' gathering means is a topic based information sources' gathering means.

Additionally, the information sources' gathering means is a user generated information sources' gathering means.

Additionally, the information sources' gathering means is a machine based information sources' gathering means.

Additionally, the information sources' gathering means comprises mechanisms to gather information from at least the following three information resources: relation extractor, name entity recognizer, and situation builder; in order to help build a context.

Typically, the system comprises searching means adapted to search for the objects within the theme clustered objects depending upon user query.

Additionally, the system comprises searching means adapted to search for the objects within the topic clustered objects depending upon user query.

Typically, the system comprises display means adapted to display searched the objects from searching means.

Typically, the system comprises ranking means adapted to rank searched the objects, the ranking being determined in accordance with reference to user context topic.

Additionally, the system comprises ranking means adapted to rank searched the objects, the ranking being determined in accordance with reference to user context theme.

According to this invention, there is also provided a method for context based co-operative learning method comprising the steps of:

identifying and indexing objects in accordance with pre-determined parameters of identification and indexing, using an identifier means;

defining parameters of identification in order to determine context topic and/or context theme of the objects based on identifiable features of the objects, using a context determination mechanism;

gathering sources of information in relation to or with reference to the identified objects, using information sources' gathering means;

searching for the objects, in response to at least a user query, within the determined context topic and/or the determined context theme, using searching means;

building clusters of relevant objects and further adapted to build at least a cluster library based on pre-defined parameters of clustering the clusters, using cluster data building mechanism;

mapping at least a context of the query for the searching means with the clusters from the cluster library to segregate and poll the objects in response to the search query in line with at least a determined context topic and/or the determined context theme, using context mapping means; and allowing multiple systems to co-operatively learn from each other based on determined context topic and/or determined context theme, using co-operative learning means.

Typically, the step of identifying and indexing objects in accordance with pre-determined parameters of identification and indexing, characterised, in that, the pre-determined parameters comprising data, meta data, meta tags, and the like identifiable features of the objects.

Typically, the step of identifying and indexing objects in accordance with pre-determined parameters of identification and indexing, characterised, in that, the step further comprises the steps of:

identifying key features in the objects, which key features relate to a topic, using key features' identification mechanism; and identifying relationships among identified key topic-based features per object, using relationship identification mechanism.

Additionally, the step of identifying and indexing objects in accordance with pre-determined parameters of identification and indexing, characterised, in that, the step further comprises the steps of:

establishing contextual/thematic features for the objects, using establishing means;

identifying key features in sad objects, which key features relate to a theme, using key features' identification mechanism;

identifying relationships among identified key thematic features per object, using relationship identification mechanism.

Typically, the step of allowing multiple systems to co-operatively learn from each other based on determined context topic and/or determined context theme, using co-operative learning means, comprising a step of allowing multiple systems to co-operatively learn from each other, systematically and iteratively, using a systemic and iterative machine learning means.

Typically, the step of allowing multiple systems to co-operatively learn from each other based on determined context topic and/or determined context theme, using co-operative learning means, comprising the steps of:

building clusters of relevant objects and further adapted to build at least a cluster library based on pre-defined parameters of clustering the clusters, using cluster data building mechanism;

mapping at least a context of the query for the searching means with the clusters from the cluster library to segregate and poll the objects in response to the search query in line with at least a determined topic, using context mapping means; characterised, in that, the pre-defined parameters of clustering being associated with pre-determined factors comprising likelihood factors, statistical factors, and closeness factors.

Additionally, the step of allowing multiple systems to co-operatively learn from each other based on determined context topic and/or determined context theme, using co-operative learning means, comprises the steps of:

building clusters of relevant objects and further adapted to build at least a cluster library based on pre-defined parameters of clustering the clusters, using cluster data building mechanism;

mapping at least a context of the query for the searching means with the clusters from the cluster library to segregate and poll the objects in response to the search query in line with at least a determined topic, using context mapping means;

characterised, in that, the pre-defined parameters of clustering being associated with identification of multiple clusters having similar behaviour.

Additionally, the step of allowing multiple systems to co-operatively learn from each other based on determined context topic and/or determined context theme, using co-operative learning means, comprises the steps of:

building clusters of relevant objects and further adapted to build at least a cluster library based on pre-defined parameters of clustering the clusters, using cluster data building mechanism;

mapping at least a context of the query for the searching means with the clusters from the cluster library to segregate and poll the objects in response to the search query in line with at least a determined theme, using context mapping means; characterised, in that, the pre-defined parameters of clustering being associated with pre-determined factors comprising likelihood factors, statistical factors, and closeness factors.

Additionally, the step of allowing multiple systems to co-operatively learn from each other based on determined context topic and/or determined context theme, using co-operative learning means, comprises the steps of:

building clusters of relevant objects and further adapted to build at least a cluster library based on pre-defined parameters of clustering the clusters, using cluster data building mechanism;

mapping at least a context of the query for the searching means with the clusters from the cluster library to segregate and poll the objects in response to the search query in line with at least a determined theme, using context mapping means;

characterised, in that, the pre-defined parameters of clustering being associated with identification of multiple clusters having similar behaviour.

Additionally, the step of allowing multiple systems to co-operatively learn from each other based on determined context topic and/or determined context theme, using co-operative learning means, comprises the steps of:

mapping the association of the query in terms of document context and/or user context and/or scenario context such that determination of document context and/or user context and/or scenario context being enabled by pre-determined factors such as likelihood factors, statistical factors, and closeness factors, using context mapping means.

Additionally, the step of allowing multiple systems to co-operatively learn from each other based on determined context topic and/or determined context theme, using co-operative learning means, comprises the steps of:

sharing determined topic and determine theme in order to allow systems to learn with multiple perspectives, using a sharing mechanism;

allowing intelligent systems to build feature vectors based on the pre-determined parameters of identification and indexing, using a feature vectors' building mechanism;

associating the built feature vectors with probabilistic weight assignment in order to build representative feature vectors, using an association mechanism; and statistical mechanism adapted to statistically build weights using multi-level a priori and advanced bias based likelihood algorithm.

Typically, the step of defining parameters of identification in order to determine context topic and/or context theme of the objects based on identifiable features of the objects, using a context determination mechanism, comprises a step of determining context (and content) based on semantic processing of the identified objects based on the identifiable features of the identified objects, using a semantic determination mechanism.

Typically, the step of defining parameters of identification in order to determine context topic and/or context theme of the objects based on identifiable features of the objects, using a context determination mechanism, comprises a step of determining context (and content) based on syntactic processing of the identified objects based on the identifiable features of the identified objects, using syntactic determination mechanism.

Typically, the step of defining parameters of identification in order to determine context topic and/or context theme of the objects based on identifiable features of the objects, using a context determination mechanism, comprises a step of determining context topic based on topic-based processing of the identified objects based on the identifiable features of the identified objects, using topic determination mechanism.

Typically, the step of defining parameters of identification in order to determine context topic and/or context theme of the objects based on identifiable features of the objects, using a context determination mechanism, comprises a step of determining at least a topic that is a representative context of textual content of the identified objects, using topic determination mechanism.

Typically, the step of defining parameters of identification in order to determine context topic and/or context theme of the objects based on identifiable features of the objects, using a context determination mechanism, comprises a step of determining at least a topic, using topic determination mechanism, based on at least one of the following:
  association among key phrases that leads to a context;
  occurrence of bigrams, trigrams, relationship and occurrence of key words and phrases; and
  relation extraction between the occurrences.

Typically, the step of defining parameters of identification in order to determine context topic and/or context theme of the objects based on identifiable features of the objects, using a context determination mechanism, comprises a step of determining at least a theme, using theme determination mechanism, based on at least one of the following:
  association among key phrases that leads to a context;
  occurrence of bigrams, trigrams, relationship and occurrence of key words and phrases; and
  relation extraction between the occurrences.

Typically, the step of defining parameters of identification in order to determine context topic and/or context theme of the objects based on identifiable features of the objects, using a context determination mechanism, comprises a step of determining at least a topic, using topic determination mechanism, based on at least one of the following:
  Top frequency unigrams;
  Top frequency bigrams;
  Longer key phrases;
  Association among frequently occurring unigrams and frequently occurring bigrams;
  Corpus of frequent objects and their statistical association leading to most relevant pre-known topics;
  Likelihood and reinforcement learning mechanisms in order to learn a new topic if there is no pre-known relevant topic;
  Semi-supervised learning mechanisms in order to learn a new topic; and
  Mapping of key phrases to a pre-known or learnt topic.

Typically, the step of defining parameters of identification in order to determine context topic and/or context theme of the objects based on identifiable features of the objects, using a context determination mechanism, comprises a step of determining context theme based on thematic processing of the identified objects based identifiable features of the identified objects, using theme determination mechanism.

Typically, the step of defining parameters of identification in order to determine context topic and/or context theme of the objects based on identifiable features of the objects, using a context determination mechanism, comprises a step of determining at least a theme, using thematic determination mechanism, based on at least one of the following extracted parameters from a set of identified objects:
  local score of words that is computed;
  global score of words, that is computed, based on similarity;
  sentence score, that is computed, based on local score, global score, and normalization; and
  situation representing primary context.

Typically, the step of defining parameters of identification in order to determine context topic and/or context theme of the objects based on identifiable features of the objects, using a context determination mechanism, comprises a step of inferring contextual features, using contextual features inference mechanism, for each of the objects, D;

$$D_i = \{P_i, T_i, S_i, O_i\} \ldots 0 \le i < n$$

where,
1. n=no. of doc in class
2. $T_i$=set of temporal features
3. $S_i$=set of spatial features
4. $P_i$=set of protagonist features
5. $O_i$=set of organizational features Typically, the step of defining parameters of identification in order to determine context topic and/or context theme of the objects based on identifiable features of the objects, using a context determination mechanism, comprises a step of inferring contextual features, using contextual features inference mechanism, for each of the objects, D;

$$D_i = \{P_i, T_i, S_i, O_i\} \ldots 0 \le i < n$$

where,
1. n=no. of doc in class
2. $T_i$=set of temporal features
3. $S_i$=set of spatial features
4. $P_i$=set of protagonist features
5. $O_i$=set of organizational features characterized, in that, step of defining parameters of identification in order to determine context topic and/or context theme of the objects based on identifiable features of the objects, using a context determination mechanism further comprises a step of clustering the inferred features of the objects for a class in to at least the following the four situation vectors, using clustering mechanism:

$T_i = \{t_0, t_1, t_2, \ldots t_n\}$ for temporal features of the class i.
$S_i = \{s_0, s_1, s_2, \ldots s_n\}$ for spatial features of the class i.
$P_i = \{p_0, p_1, p_2, \ldots p_n\}$ for protagonist features of the class i.
$O_i = \{o_0, o_1, o_2, \ldots _n\}$ for organizational features of the class i.

wherein, the situation vectors, which define a theme, are generated for each class, the situation vectors form at least a situation model/thematic model for that category:

$$CS_j = \{T_j, S_j, P_j, O_j\} \ldots j = 1 \text{ to } C$$

where,
2. C=no. of categories
3. $T_j = \{t_0, t_1, t_2, \ldots, t_k\}$
4. $S_j = \{s_0, s_1, s_2, \ldots, s_k\}$
5. $P_j = \{p_0, p_1, p_2, \ldots, p_k\}$
6. $O_j = \{o_0, o_1, o_2, \ldots, o_k\}$ Typically, the step of defining parameters of identification in order to determine context topic and/or context theme of the objects based on identifiable features of the objects, using a context determination mechanism, comprises a step of establishing a theme during the use of the method for searching the theme, using thematic relationship establishment means, being established based on at least one of the parameters comprising user profile, scenario, and knowledge base.

Additionally, the step of defining parameters of identification in order to determine context topic and/or context theme of the objects based on identifiable features of the objects, using a context determination mechanism, comprises a step of determining a thematic relationship between the objects, using thematic relationship determination means.

Typically, the method comprises a step of allowing a user to input data for topic determination or identification, using user input means or a user and information context defining means, thereby allowing the system to form a cluster of objects, based on the topic, to be searched or retrieved.

Additionally, the method comprises a step of allowing a user to input data for theme determination or identification, using user input means or a user and information context defining means, thereby allowing the system to form a cluster of objects, based on the theme, to be searched or retrieved.

Typically, the method comprises a step of classifying a user profile accessing the system and the searching means, using classification means.

Typically, the method comprises a step of allowing the system to learn a context from the at least a user query and corresponding output search result, using context based learning means, the context based learning means being an iterative learning mechanism and involving results based on pre-identified topic defined by the method.

Additionally, the method comprises a step of allowing the system to learn a context from the at least a user query and corresponding output search result, using context based learning means, the context based learning means being an iterative learning mechanism and involving results based on pre-identified theme defined by the method.

Typically, the step of gathering sources of information in relation to or with reference to the identified objects, using information sources' gathering means, comprises a step of gathering theme based sources of information in relation to or with reference to the identified objects, using theme based information sources' gathering means.

Additionally, the step of gathering sources of information in relation to or with reference to the identified objects, using information sources' gathering means, comprises a step of gathering topic based sources of information in relation to or with reference to the identified objects, using topic based information sources' gathering means.

Additionally, the step of gathering sources of information in relation to or with reference to the identified objects, using information sources' gathering means, comprises a step of gathering user generated based sources of information in relation to or with reference to the identified objects, using user generated information sources' gathering means.

Additionally, the step of gathering sources of information in relation to or with reference to the identified objects, using information sources' gathering means, comprises a step of gathering machine based sources of information in relation to or with reference to the identified objects, using machine based information sources' gathering means.

Additionally, the step of gathering sources of information in relation to or with reference to the identified objects, using information sources' gathering means, comprises a step of gathering information from at least the following three information resources: relation extractor, name entity recognizer, and situation builder; in order to help build a context.

Typically, the method comprises a step of searching for the objects within the theme clustered objects depending upon user query, using searching means.

Additionally, the method comprises a step of searching for the objects within the topic clustered objects depending upon user query, using searching means.

Typically, the method comprises a step of displaying searched the objects from searching means, using display means.

Typically, the method comprises a step of ranking searched the objects, the ranking being determined in accordance with reference to user context topic, using ranking means.

Additionally, the method comprises a step of ranking searched the objects, the ranking being determined in accordance with reference to user context theme, using ranking means.

BRIEF DESCRIPTION OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
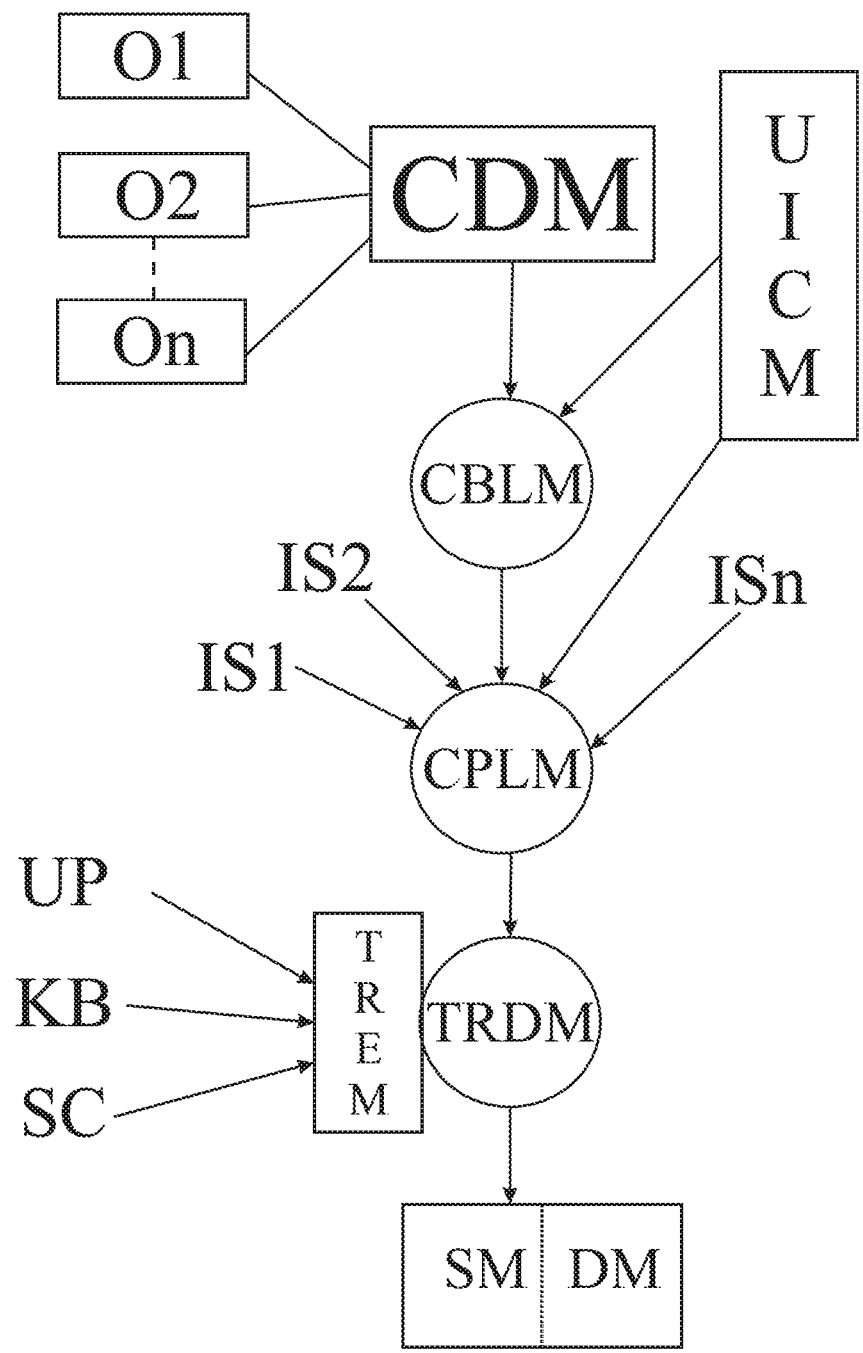
FIGS. 1 and 2 illustrate a schematic of the system and method of this invention.
Figure 2:
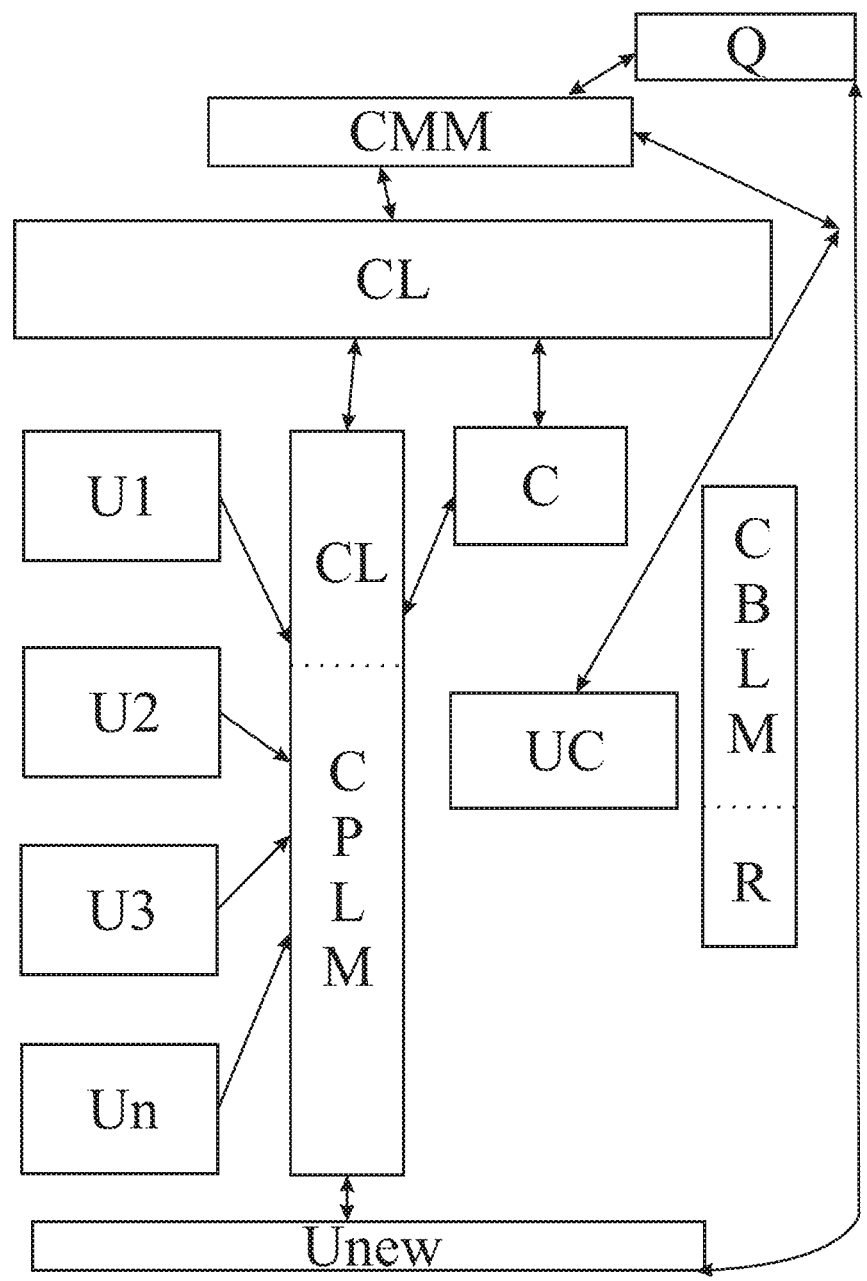

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use example embodiments. Several different embodiments not specifically disclosed herein may fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, "and" and "or" are equivalent to the term "and/or," which includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange routes between two devices, including intermediary devices, networks, etc., connected wirelessly or not.

As used herein, the singular forms "a", "an" and "the" and the plural form "indicia" are intended to include both the singular and plural forms, unless the language explicitly indicates otherwise. It will be further understood that the terms "comprises," "comprising," "includes," and/or "including," when used herein, specify the presence of stated features, integers, steps, operations, elements, and/or components, but do not themselves preclude the presence or addition of one or more other features, integers, steps, operations, elements, components, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Search techniques and techniques to find relationships among different objects based on keywords have their own limitations. There techniques give same results even if context is changed. The mere context based techniques without co-operative learning ability could not handle data coming from more than one source (with different contexts). Since the context is dynamic. It keeps changing with user, with scenario and even with place and position. Many times when anyone starts a search the results are out of the context. There are typical issues like not providing context, failing to express own context, the inability of engine to process the context. Simple use of words and key phrases in absence of association cannot provide the context. Context obtained in absence of co-operative learning is typically not useful in complex scenarios.

Furthermore, there are no standard techniques available for defining context, modeling context, comparing contents across contexts and discovering contextual patterns from text. Learning context of the text would be of great help for analyzing the information contained in the text. For example, organizing the information according to context would help the search engines for fast and efficient retrieval of information, analyzing the search logs for contextual patterns can help a search engine developer to better serve its customers by re-organizing the search results according to the contexts of a new query. Analyzing the evolution of topics or decaying of topics in scientific literature would also help researchers to better organize and summarize the literature and to discover and predict new research trends. Also, analyzing the sentiments in customer reviews related to products and social events would help in summarizing the public opinion about them the products. Studying Author-topic patterns can also make easy the finding of experts and their perceptive of the research communities. Analyzing the text for knowledge building using information from multiple resources also helps in inferring a context.

Designing a context based learning system therefore becomes a great challenging task. In the process of learning context, several challenges related to text mining need to be addressed, which includes:
1. High dimensionality of the feature set
2. Feature Extraction and selection issues
3. High computational complexity issues
4. Parameter Estimation issues of Naive Bayesian Model
5. Context Identification
6. Context Modeling Today's search engines do not produce search results that are driven, consolidated, and summarized by the major contextual uses based on the overall context and not just phrases. As a result, search results can be a disorganized sometimes not useful at all. This forces a user to surf through results without reaching to expected document, object. There were a few attempts to use simple key phrases for context determination. Without understanding perspective and in absence of ability to learn co-operatively this search becomes a mere extension to simple term frequency based searches.

The major problem faced is not just search but learning, understanding context and establishing contextual relationship to search and keep learning to search in better way with additional learning. The techniques so far proposed failed to understand thematic relationship.

Hence, there is a need for context learning systems and methods, theme learning systems and methods, topic learning systems and methods, and correctional elements between these systems and methods, thereof.

An object of the invention is to provide a system and method which provides iterative learning capability in a search engine.

Another object of the invention is to provide a system and method which provides co-operative learning capability in a search engine.

Yet another object of the invention is to provide a system and method which provides thematic relationship based search engine.

Still another object of the invention is to provide a system and method which provides thematic relationship based learning capability in a search engine.

An additional object of the invention is to provide a system and method which provides establishment of contextual relationship in a search engine.

Yet an additional object of the invention is to provide a system and method which provides a continuous learning search engine.

Still an additional object of the invention is to provide a system and method which provides understanding of context based learning in a search engine.

Another object is provide thematic association among one or more content documents to establish contextual ranking and enable user to search based on example Example embodiments include systems and methods for providing a context-based, co-operative learning platform that represents thematic relationships. Example embodiments may include, and example methods may use computer processors, relays, servers, input equipment including keyboards and voice-recognition software, networks, and attendant memory and busses that are intentionally designed— that is, programmed—with functionality described herein, through both software and hardware configurations. As such, it is understood that devices like identifiers, context/semantic determinators, searchers, gatherers, context mappers, data builders, selectors, feature/relationship identifiers, etc. includes computer-processor-driven devices appropriately-programmed or designed to perform the described functionality.

Figure 3:
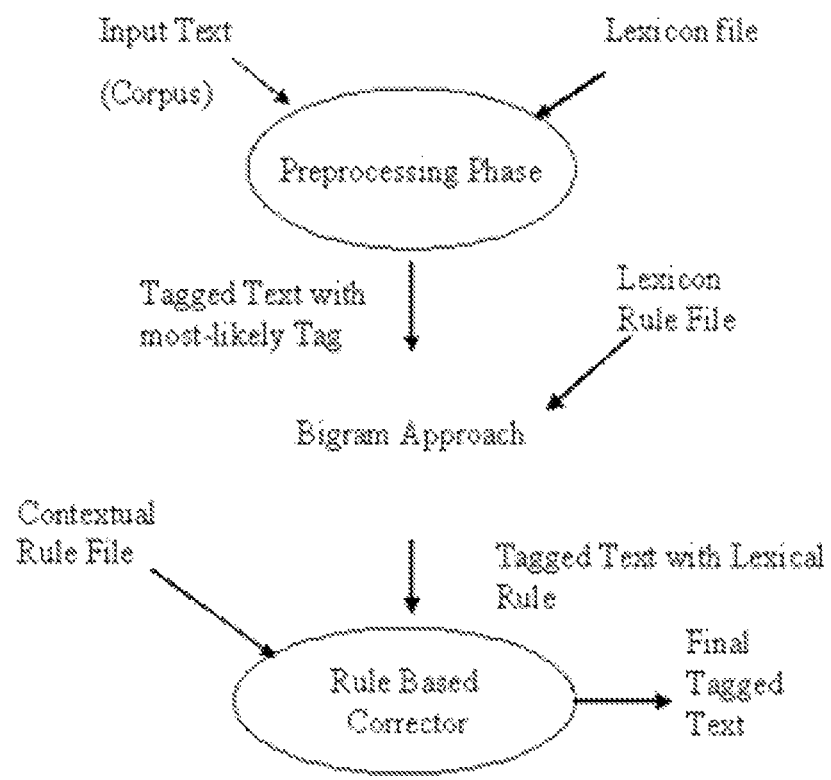
FIG. 3 illustrates mechanism for situation determination.
Figure 4:
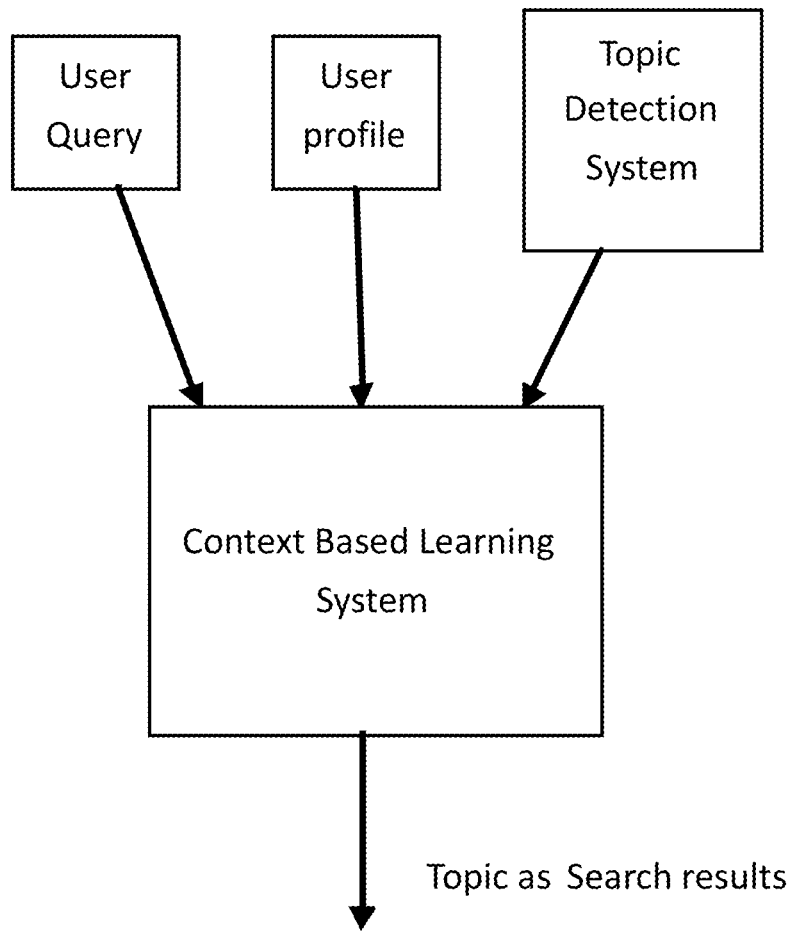
FIG. 4 illustrates context based learning mechanism which outputs topic as search results.
Figure 5:
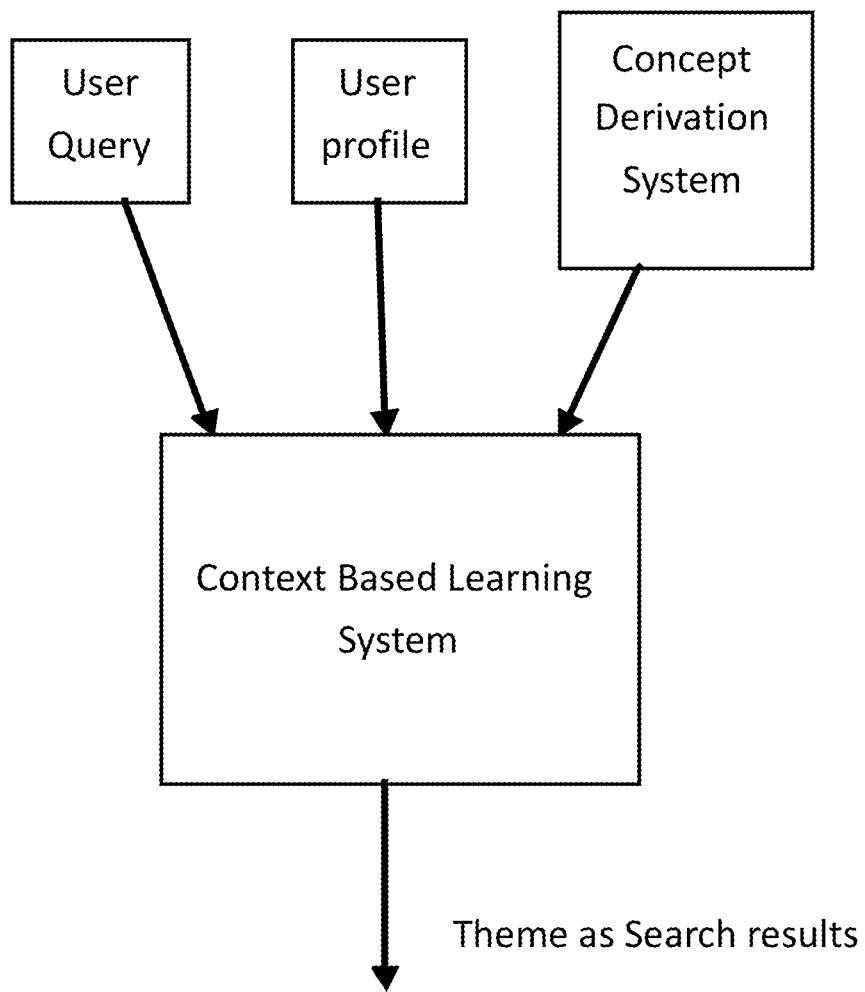
FIG. 5 illustrates context based learning mechanism which outputs theme as search results.

In accordance with an embodiment of this invention, there is provided an identifier means adapted to identify and index objects in accordance with pre-determined parameters of identification and indexing. The identifier means comprises context determination mechanism (CDM) adapted to determine context (and content) of the objects based on data, meta data, meta tags, and the like identifiable features of the objects. The context determination means further comprises semantic determination mechanismadapted to determine context (and content) based on semantic processing of the objects based on data, meta data, meta tags, and the like identifiable features of the objects. Typically, the semantic processing is correlated with at least a lexical repository and at least a sense repository database. The context determination means further comprises syntactic determination mechanismadapted to determine context (and content) based on syntactic processing of the objects based on data, meta data, meta tags, and the like identifiable features of the objects. Typically, the syntactic processing comprises the following steps, as seen in FIG. 3 of the accompanying drawings:

1) Search (input) (content) text (corpus) and at least a lexicon file are pre-processed to obtain tagged text with most-likely tag.

2) The tagged text (contents) with most likely tag and at least a Lexicon rule file are processed by Bigram approach to obtain tagged text with lexical rule.

3) The tagged text with lexical rule along with at least a contextual rule file are processed with a rule based corrector to obtain final tagged text.

The context determination means further comprises topic determination mechanismadapted to determine context topic based on topic-based processing of the objects based on data, meta data, meta tags, and the like identifiable features of the objects. This identifier means involves a establishing means adapted to perform a step of establishing contextual/topic-based features for the objects. The identifier means involves a key features' identification mechanism adapted to perform a further step of identifying key features in the objects, which key features relate to a topic. The identifier means involves a relationship identification mechanism adapted to involve still a further step of identifying relationships among identified key topic-based features per object. According to one embodiment, topics could be hierarchical topics, in that, a main topic can have sub-topics hierarchically linked to one another.

Figure 6:
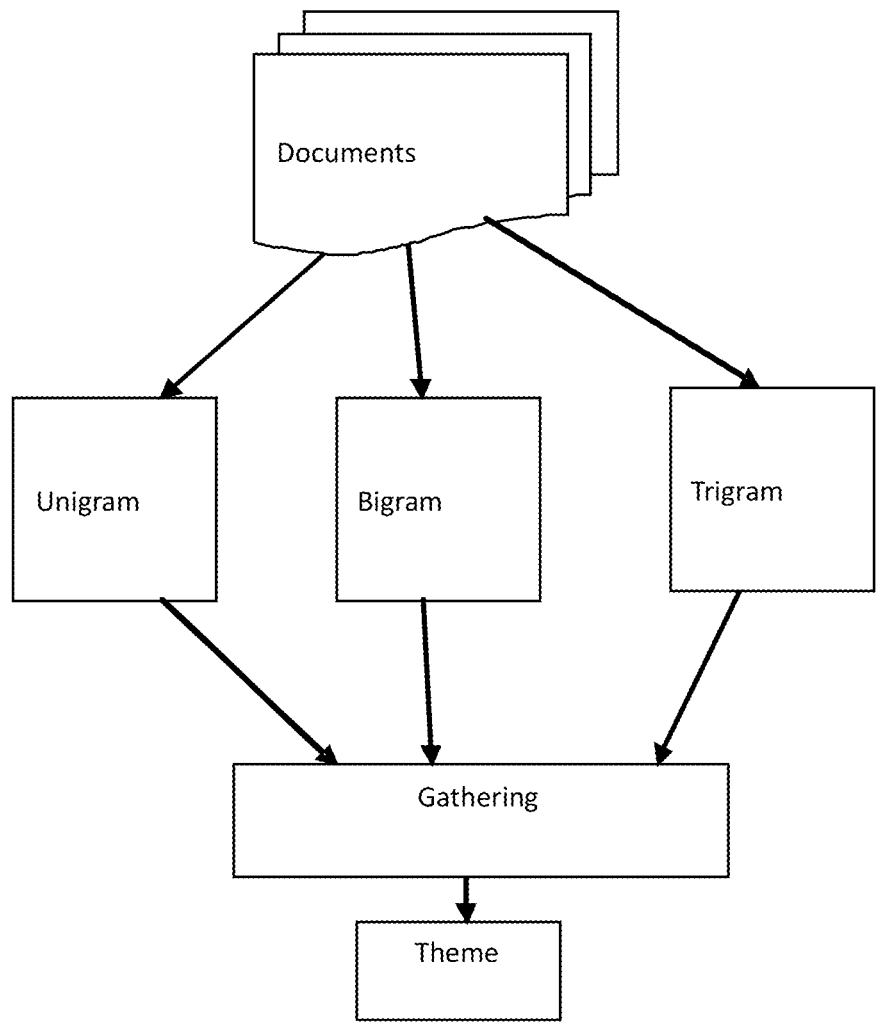
FIG. 6 illustrates relation extraction for theme.
Figure 7:
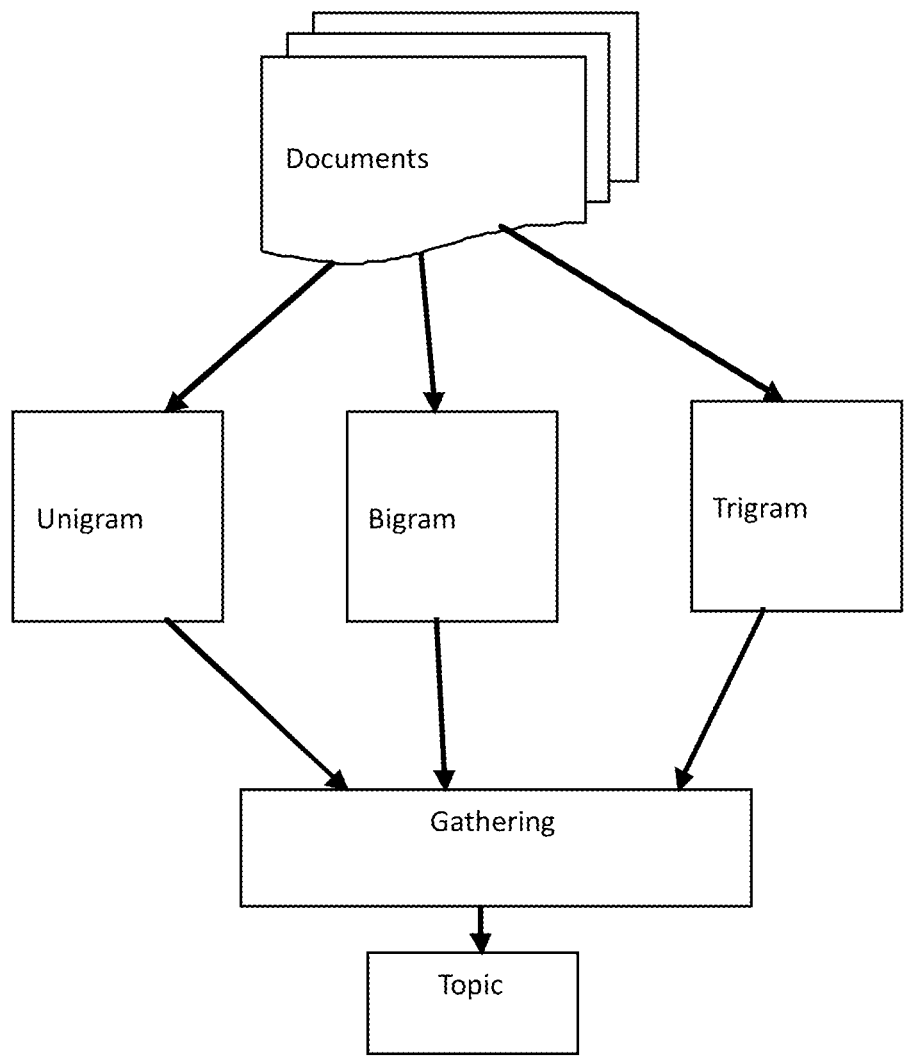
FIG. 7 illustrates relation extraction for topic.

Topic determination refers to determination of topic that is a representative context of the textual content of the objects. The relevant features of the documents/contents are determined in space of concepts. Interestingly, a topic is not a mere BOW (bag of words) and frequently occurring key phrases. It is an association among key phrases and that leads to a context. Typically, a topic is determined based on the occurrence of bigrams, trigrams, relationship and occurrence of key words and phrases. There is relation extraction between these occurrences. Situation model is used to determine the context with reference to situation parameters. This is shown in FIG. 7 of the accompanying drawings. Similarly, a theme is determined based on the occurrence of bigrams, trigrams, relationship and occurrence of key words and phrases. There is relation extraction between these occurrences. Situation model is used to determine the context with reference to situation parameters. This is shown in FIG. 6 of the accompanying drawings.

Typically, the topic determination mechanism determines a topic based on the following extracted parameters from a set of identified objects:
Top frequency unigrams;
Top frequency bigrams;
Longer key phrases;
Association among frequently occurring unigrams and frequently occurring bigrams;
Corpus of frequent objects and their statistical association leading to most relevant pre-known topics;
Likelihood and reinforcement learning mechanisms in order to learn a new topic if there is no pre-known relevant topic;
Semi-supervised learning mechanisms in order to learn a new topic;
Mapping of key phrases to a pre-known or learnt topic.

Typically, topic determination deals with the construction of concept space i.e. confident single-value (unigram) words and confident multi-value (bigram, trigram) words. Consider documents to be bag of words (ordering of words is maintained). Upper case letters are used to represent sets and lower case letters are used for elements of the set. Let $D=\{d1, d2, \ldots, dm\}$ represent the document set of the input corpus. $W=\{w1, w2, \ldots, wn\}$ represents the set of all the different term features in D. $T=\{t1, t2, \ldots, tp\}$ is the concept space. $C=\{c1, c2, \ldots, cm\}$ is the class label. Let $tf(di,w)$ denote the frequency of term feature $w \in W$ in the document $di \in D$. $F=\{f1, f2, \ldots, fm\}$ be the set of names of files such that fi is the filename of document $di \in D$. Also, $DH=\{dh1, dh2, \ldots, dhm\}$ be the set of document header of files $fi \in F$.

Topic Determination Mechanism is based on either determining topic based on association among key phrases, occurrence of bigram, trigram, and relationship between them or extracting relations between key phrases. Topic Detection is also based on extracted information (like bigram, trigram, and the like,)

The context determination means further comprises thematic determination mechanismadapted to determine context theme based on thematic processing of the objects based on data, meta data, meta tags, and the like identifiable features of the objects. This identifier means involves a step of establishing contextual/thematic features for the objects. The identifier means involves a further step of identifying key features in the objects, which key features relate to a theme. The identifier means involves a still further step of identifying relationships among identified key thematic features per object. According to one embodiment, themes could be hierarchical themes, in that, a main theme can have sub-themes hierarchically linked to one another.

Typically, the theme determination mechanism determines a theme based on the following extracted parameters from a set of identified objects:
Local score of words that is computed;
Global score of words, that is computed, based on similarity across;
Sentence score, that is computed, based on local score, global score, and normalization;
The situation represents primary context.

The relationship between the concepts and the topics are analyzed to identify context. The context is that information that describes the relationship between derived concepts and its associated topics. The relationship is analyzed by considering the documents that are processed using the TDR algorithm for finding topics along with the associated concepts. For each document, a topic and the set of associated concepts are discovered. These topics and their concepts are maintained. The procedure of identifying the relationship begins by grouping the identical topics together (by identical, it means if two strings match).

For example, if for topics like:

| Topic Id | Topic Name | Concepts/keywords |
|---|---|---|
| T1 | Text Categorization | K1 |
| T2 | Unsupervised text categorization | K2 |
| T3 | Classification | K3 |
| T4 | Text Categorization | K4 |
| T5 | Text Mining | K5 |
| T6 | Information Retrieval | K6 |
| T7 | Text Categorization | K7 |
| ... | ... | ... |
| ... | ... | ... |
| T999 | Text Mining | K999 |
| T1000 | Machine Learning | K1000 |

K1, K2, -, K1000 contains the list of keywords which are concepts identified during the word decomposition. Group identical topics. T1, T4 and T7 are identical as all of them have topic "Text categorization". Similarly T5 and T999 are identical. By grouping it means, add their concepts and maintain their occurrence frequency, and the like.

| Topic Name | Frequency | Concepts/keywords list |
|---|---|---|
| Text Categorization | 3 | K1 + K4 + K7 |
| Text Mining | 2 | K5 + K999 |

The concepts K1, K4 etc are actually replaced by their keyword list. Then, the system and method finds out term frequency of every keyword in the list of concepts for each topic. After that a list of keywords, is obtained, with their frequencies. Set a threshold limit for appropriate concept selection considering accuracy. Set a threshold of 50% or 70%—dynamically based on relevance using gating algorithm. This algorithm dynamically changes the window based on relevance. Any keyword that has frequency that crosses the threshold is extracted to be related to the topic. Suppose the threshold is set to 50%, then:if (((frequency of the concept)/(frequency of the topic))*100>threshold) then {concepts with frequencies greater than 50% threshold are identified as related to the topic}

In the above example, the frequency of the topic i.e., text categorization is 3. Frequency of the keyword depends upon the number of occurrence of the keyword within the set.

For example, consider the following, if the topics are:

| Topic Id | Topic Name | Concepts/keywords along with their list |
|---|---|---|
| T1 | Text Categorization | K1 (machine learning, text, retrieval, Classification, . . .) |
| T2 | Unsupervised TC | K2 |
| T3 | Classification | K3 |
| T4 | Text Categorization | K4 (information, retrieval, fmeasure, Classification, . . .) |
| T5 | Text Mining | K5 |
| T6 | Information Retrieval | K6 |
| T7 | Text Categorization | K7(retrieval, naivebayes, classification, performance, . . .) |
| ... | ... | ... |
| ... | ... | ... |
| T999 | Text Mining | K999 |
| T1000 | Machine Learning | K1000 | then after grouping identical topics it would become like:

| Topic Name | Frequency | Concepts/keywords |
|---|---|---|
| Text Categorization | 3 | K1 + K4 + K7 (machine learning, text, retrieval, Classification, . . .) (information, retrieval, fmeasure, Classification, . . .)(retrieval, naivebayes, classification, performance, . . .) |
| Text Mining | 2 | K5 + K999 (. . .) |

Frequency of keyword becomes:

| Topic Name | Frequency | Concepts (or Keywords) | frequency of concept/keyword |
|---|---|---|---|
| Text Categorization | 3 | K1 + K4 + K7 machine learning | 1 |
| | | text | 1 |
| | | Retrieval | 3 |
| | | classification | 3 |
| | | Information | 1 |
| | | fmeasure | 1 |
| | | naivebayes | 1 |
| | | performance | 1 |
| | | ... | |
| Text Mining | 2 | K5 + K999 | |

Applying the above formula for threshold=50; for the above example, following is the result.

For the concept: retrieval (3-freq), the formula finds its relatedness as: 3/3*100>=50 then identified it as related. Thus, the related words help identify the context to which the topic belongs. If an index is created based on the process to extract the relationships, and then if the given keywords are as "text categorization", then the algorithm would return the related term that are associated with "text categorization". Each topic is considered as a cluster with the related terms.

The Situation Extractor basically aims at finding important components of text from the chunks of text. That is, it finds important sentences from chunks of text. For finding important sentences, it uses the score values determined for each sentences. The score values are calculated using the local and global score values of each word within the sentence. The local score (LS) of a word within a sentence is calculated by adding the score of the considered word with the score of the clause in which the word appears. The score of a word is the frequency of the word and the score of a clause is the addition of scores of all trigrams and bigrams containing the word. The score for bigrams or trigrams are calculated by adding the frequency of each word falling in bigram or trigram.

$$LS(w)=(\text{the\_score\_given\_to\_}w)+(\text{the\_score\_given\_to\_the\_clause\_in\_which\_}w\text{\_appears})$$

After local score calculation, global score (GS) for each word has to be calculated. It is calculated by first finding the similarity of each word with the set of all words in the document and summing the local score of all those words whose similarity value is greater than a predefined threshold. Wordnet path-similarity measure is used for finding similarity between two words.

$$GS(w) = \sum_{w'} (LS(w') \times \text{Similarity}(w, w'))$$

After finding local and global score, sentence score (SV) is determined. It is found by summing the square root of the product of local and global scores values of all words in the sentence.

$$SV(s) = \sum_{w\_in\_s} \sqrt{LS(w) \times GS(w)}$$

The sentence score is simply not calculated by adding the local and global score values of words in the sentence. If this is done, a long sentence will get higher importance value as it contains more words in it. To avoid selection of long sentences, the system and method normalize the score value using the sentence length as a parameter.

So now there are, in the chunk, sentences with higher score values. For building a situation, higher sentence score is not the only criteria for adding a sentence in a situation. Initially, the highest score sentence is added to a situation. Before adding the next higher score value sentence, a check is performed to find if this considered sentence is connected with the first highest score sentence by a connective like AND. If so, then the next higher score sentence is found unnecessary and not added to situation. This is because the words like "AND" may speak about things already spoken about and may not add any new information to the situation. Also, if the next higher score sentence starts with an elaborating connective, it is found unnecessary and not added to situation by setting its score value to 0. Now, if the next higher score sentence is simple sentence then it is added to the situation. The procedure is repeated for all sentences in a chunk. Thus the system and method is able to determine situation (s) for every incoherent chunk which eventually builds a complete situation for the input text.

Typically, the contextual features are inferred, using contextual features inference mechanism, for each object D;

$$D_i = \{P_i, T_i, S_i, O_i\} \ldots 0 < i < n$$

where,
1. n=no. of doc in class
2. $T_i$=set of temporal features
3. $S_i$=set of spatial features
4. $P_i$=set of protagonist features
5. $O_i$=set of organization features All the inferred features of the documents for a class are clustered, using clustering mechanism, into the four situation vectors like:
$T_i = \{t_0, t_1, t_2, \ldots t_n\}$ for temporal features of the class i.
$S_i = \{s_0, s_1, s_2, \ldots s_n\}$ for spatial features of the class i.
$P_i = \{p_0, p_1, p_2, \ldots p_n\}$ for protagonist features of the class i.
$O_i = \{o_0, o_1, o_2, \ldots _n\}$ for organizational features of the class i.

Situation vectors, which define a theme, are generated for each class. These situation vectors form the situation model/thematic model for that category.

$$CS_j = \{T_j, S_j, P_j, O_j\} \ldots j=1 \text{ to } C$$

where,
1. C=no. of categories
2. $T_j = \{t_0, t_1, t_2, \ldots, t_k\}$
3. $S_j = \{s_0, s_1, s_2, \ldots, s_k\}$
4. $P_j = \{p_0, p_1, p_2, \ldots, p_k\}$
5. $O_j = \{o_0, o_1, o_2, \ldots, o_k\}$ According to a non-limiting exemplary embodiment, the context may be based on the following:
profile (profile based user clustering)
query (Bayesian query based likelihood)
metadata (closeness based on metadata)
behavior (Behavior based analysis and learning to map behavior)
user classification
User grouping
Co-operative search In accordance with another embodiment of this invention, there is provided a user input means or a user and information context defining means (UICM) adapted to allow a user (U1, U2, U3, Un, Unew) to input data for theme/context determination or identification. This allows a user to establish a theme or a context with which the system and method of this invention will form a cluster of objects (O1, O2, . . . On) to be searched or retrieved. This involves a step of systemic context determination for user and for each of the search object.

The system and method of this invention comprises a classification means adapted to classify a user profile. This can be determined based on the search query, user history, login preferences, cache history, IP history, or the like parameters related to a user. A profile library, a theme library, and the like may be built.

In accordance with yet another embodiment of this invention, there is provided a context based learning means (CBLM) adapted to allow the system and method of this invention to learn from user queries and output search results. This learning means is an iterative learning mechanism and involves results based on pre-identified themes or context defined by the system and method of this invention or a user or both. This involves a step of building an overall search theme. Typically, context may be search context or user context or the like.

In accordance with still another embodiment of this invention, there is provided an information sources' gathering means adapted to allow the system and method of this invention to gather sources of information (IS1, IS2, . . . . ISn) in relation to or with reference to objects. This information sources' gathering means comprises theme based or context based information sources' gathering means. This information sources' gathering means may be a user generated information sources' gathering means. Also or alternatively, this information sources' gathering means may be a machine based information sources' gathering means. Typically, there are at least the following three information resources: relation extractor, name entity recognizer, and situation builder. Knowledge from these information resources help to build a context. The relations extracted and extended help to add up to the knowledge. From all this information, the system was satisfactorily able to learn context specifically for medical abstract from aimed corpus. For any other text, the context learned was the comprehension of the text.

In accordance with an additional embodiment of this invention, there is provided a co-operative learning means (CPLM) adapted to allow multiple systems of this invention to co-operatively learn theme/context generation, theme/context identification, object theme/context identification, search analysis based on theme/context and the like means and mechanisms in order to 'train' the system and method of this invention to output results based on identified or determined themes/contexts. This involves systemic machine learning. This further involves a step of systemic theme/context determination for user and for each of the search object through co-operative learning. Co-operative learning is based on multi-level association and it works on information coming from many sources. Co-operative learning essentially relates to two or more machines or systems learning/teaching (from) each other. Further, co-operative learning involves identification of a correct profile, a correct context, correct theme, and/or the like. This is based on learning from various machines and eventually uses the concept of iterative learning to progressively or iteratively become more intelligent and accurate. The co-operative learning means is adapted to allow multi-level association so that more than one information sources work with each other. The information sources are associated with each other in order to build a higher level of co-operative learning. The co-operative learning means comprises sharing mechanism further adapted to share determined topic and determine theme in order to allow systems to learn with multiple perspectives. The co-operative learning means, specifically, comprises a feature vectors' building mechanism adapted to allow intelligent systems to build feature vectors based on said pre-determined parameters of identification and indexing. These feature vectors are associated, by means of association mechanism, with probabilistic weight assignment in order to build representative feature vectors. Cooperative learning component, comprising statistical mechanism, will statistically build weights using multi-level a priori and advanced bias based likelihood algorithm.

In accordance with yet an additional embodiment of this invention, there is provided a thematic relationship establishment means (TREM) adapted to establish a theme during the use of the system and method of this invention for searching. The theme may be established based on the parameters involving user profile (UP), scenario (SC), knowledge base (KB) and the like. Learning user profile is imperative for the system and method of this invention. User profile can be learnt by the system of this invention using any techniques. These techniques may involve reinforcement learning techniques which further include heat maps, time maps, click maps, access to public data, access to private data, and the like.

In accordance with still an additional embodiment of this invention, there is provided a thematic relationship determination means (TRDM) adapted to determine a thematic relationship between objects. A plurality of objects may be theme identifies and clustered based on the theme which is common to the objects. An object may have multiple themes, and hence, an object can be a part of multiple clusters in which each cluster is a theme or a part of a theme. This involves a step of building an overall search theme.

In accordance with still another embodiment of this invention, there is provided a cluster data building mechanism adapted to build clusters (C) of relevant data. A cluster library (CL) is formed based on pre-defined parameters. As a query is input into the search system and method of this invention, relevant context determination and thematic determination occurs. This results in segregation of searched objects in accordance with various defined themes. This defined themes may be user defined themes or machine defined themes or both. A context mapping means (CMM) maps the context of the query with the clusters (C) in the cluster library to segregate and poll the objects of search in line with themes. Clustering (CL) may take place in the co-operative learning means (CPLM) The context mapping means (CMM) maps the association of the query in terms of document context and/or user context and/or scenario context. This determination of document context and/or user context and/or scenario context is enabled by pre-determined factors such as likelihood factors, statistical factors, and closeness factors.

The process of identifying which multiple series have similar behavior and combining those series together is called as clustering. When the system and method receives a set of series with a similar behavioral patterns, then these series are used to form a representative pattern. This representative pattern can be referred as a cluster. There can be many such patterns. The closeness of such patterns is measured and the system and method may decide to merge some of these patterns. All series that have a similar shape form a cluster. Clustering is based on the closeness factor. An understanding of the C Value is necessary to comprehend why clustering works. A Closeness factor (C) can be calculated between two series. This C value quantifies the difference in the shape of each series. The lower the C Value, the smaller the difference. A C value of 0 signifies an exact match of shapes even though the volumes might be different.

In accordance with another additional embodiment of this invention, there is provided a searching means (SM) adapted to search for objects within the theme clustered objects depending upon user query (Q).

In accordance with yet another additional embodiment of this invention, there is provided a display means (DM) adapted to display searched objects from the searching means.

In accordance with still another embodiment of this invention, there is provided a ranking means (R) adapted to rank searched objects. This may involve user ranking or machine ranking or both. This involves a step of ranking the objects with reference to user context in overall theme/topic. Ranking (R) may take place along with context based learning means (CBLM). User context (UC) can be added to as input to the ranking means (R) and context based learning means (CNLM). The user context is derived from context mapping means (CMM).

The applications of the system and method of this invention are not limited to search but includes:
  object association, ranking of objects, ranking of text documents, ranking of contents and establishing systemic relationships
  Web based search
  Co-operative learning based search
  Document and content search
  Document collation
  Context based grouping
  Knowledge building
  Information based learning
  Document and content representation
  WAN/LAN based systems
  Database management or polling systems
  Document management systems The system and method of this invention provides searching, arranging and most importantly ranking objects with reference to context and representing the thematic relationship among objects. Further the results are arranged and presented with thematic relationship with reference to user or application context. The ability to build context—learn based on known context and co-operatively learn to refine context and further thematic relationships. As a result new search results are generated with reference to theme and the relationships among different objects are represented with reference to theme for decision-making. The ability of co-operative learning allows to correct wrong results, handle new contexts and scenarios without compromising accuracy.

The system and method of this invention can be used for the following:

Can find relationships among documents, contents and relevance based collation on assorted web documents and contents Can find relationship between objects Searching document and objects with reference to scope, context and scenario and also in context to user profile The co-operative learning ability with reference to multiple relationship formation Can be used in advanced search engines, profile matching, match making (B2C, B2B, C2C, G2C), object matching Can be used to define scope of relevance User categorization, information filtering Some example embodiments being described here, it is understood that one or more examples and components thereof may be used in combination and/or in duplication to produce multiple options and functionalities for context-based object searching. It will further be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A context based co-operative learning system comprising:
    an identifier configured to identify and index objects in accordance with pre-determined parameters of identification and indexing;
    a context determinator configured to define parameters of identification in order to determine context topic and/or context theme of the objects based on identifiable features of the objects;
    an information sources gatherer configured to gather sources of information in relation to or with reference to the identified objects;
    a searcher configured to search for the objects, in response to at least a user query, within the determined context topic and/or the determined context theme;
    a cluster data builder configured to build clusters of relevant objects and further adapted to build at least a cluster library based on pre-defined parameters of clustering the clusters;
    a context mapper configured to map at least a context of the query for the searcher with the clusters from the cluster library to segregate and poll the objects in response to the search query in line with at least a determined context topic and/or the determined context theme; and
    a co-operative learner configured to allow multiple systems to co-operatively learn from each other based on determined context topic and/or determined context theme.

2. The system of claim 1 wherein the identifier is further configured to identify and index objects in accordance with pre-determined parameters of identification and indexing, and wherein the identifier includes,
    a selector configured to establish contextual/thematic features for the objects,
    a key features identifier configured to identify key features in the objects, wherein the key features relate to a theme, and
    a relationship identifier configured to identify relationships among identified key thematic features for each of the objects.

3. The system of claim 1, wherein the context determinator includes at least one of,
    a semantic determinator configured to determine context and content based on semantic processing of the identified objects based on the identifiable features of the identified objects,
    a syntactic determinator configured to determine context and content based on syntactic processing of the identified objects based on the identifiable features of the identified objects,
    a first topic determinator configured to determine context topic based on topic-based processing of the identified objects based on the identifiable features of the identified objects, and
    a second topic determinator configured to determine at least a topic that is a representative context of textual content of the identified objects.

4. The system of claim 1, wherein the context determinator includes a topic determinator configured to determine a topic or theme based on at least one of,
    An association among key phrases that leads to a context,
    An occurrence of bigrams, trigrams, relationship and occurrence of key words and phrases, and
    a relation extraction between the occurrences.

5. The system of claim 1, wherein the context determinator includes a topic determinator configured to determine a topic based extracted parameters from a set of identified objects including at least one of,
    top frequency unigrams,
    top frequency bigrams,
    longer key phrases,
    an association among frequently occurring unigrams and frequently occurring bigrams,
    a corpus of frequent objects and their statistical association leading to most relevant pre-known topics,
    a likelihood and reinforcement learning mechanisms in order to learn a new topic if there is no pre-known relevant topic,
    semi-supervised learning mechanisms in order to learn a new topic, and
    a mapping of key phrases to a pre-known or learnt topic.

6. The system of claim 1, wherein the context determinator includes a thematic determinator configured to determine a theme based on extracted parameters from a set of identified objects, wherein the extracted parameters include at least one of,
    a local score of words that is computed,
    a global score of words, that is computed, based on similarity,
    a sentence score, that is computed, based on local score, global score, and normalization, and
    a situation representing primary context.

7. The system of claim 1, wherein the information sources gatherer is configured to gather information from at least a relation extractor, a name entity recognizer, and a situation builder to build a context.

8. The system of claim 1, wherein the cooperative leaner includes,
   a cluster data builder configured to build clusters of relevant objects and to build at least a cluster library based on pre-defined parameters of clustering the clusters, and
   a context mapper configured to map at least a context of the query for the searcher with the clusters from the cluster library to segregate and poll the objects in response to the search query in line with at least a determined topic, wherein the pre-defined parameters of clustering are associated with pre-determined factors including likelihood factors, statistical factors, and closeness factors, and wherein the pre-defined parameters of clustering further are associated with identification of multiple clusters having similar behaviour.

9. The system of claim 1, wherein the information sources gatherer is selected from a group consisting of a theme-based information sources gatherer, a topic-based information sources gatherer, a user-generated information sources gatherer, and a machine-based information sources gatherer.

10. The system of claim 1, wherein the context determinator includes contextual features determinator configured to infer contextual features for each of the objects, wherein each object is D in $$Di=\{Pi,Ti,Si,Oi\} \ldots 0<i<n$$

where, n is a number of docs in a class, Ti is a set of temporal features, Si is a set of spatial features, Pi is a set of protagonist features, and Oi is a set of organizational features.

11. The system of claim 10, wherein the context determinator further includes a clusterer configured to cluster the inferred features of the objects for a class into a situation vector including:
   $Ti=\{t0, t1, t2, \ldots tn\}$ for temporal features of the class i;
   $Si=\{s0, s1, s2, \ldots sn\}$ for spatial features of the class i;
   $Pi=\{p0, p1, p2, \ldots pn\}$ for protagonist features of the class i;
   $Oi=\{00, 01, o2, \ldots n\}$ for organizational features of the class i;
wherein, the situation vectors define a theme and are generated for each class, and wherein the situation vectors form at least a situation model/thematic model for that category CS in $$CSj=\{Tj,Sj,Pj,Oj\} \ldots j=1 \text{ to } C \text{ where, } C \text{ is a number of categories, and}$$

$Tj=\{t0, t1, t2, \ldots, tk\}$;
$Sj=\{s0, s1, s2, \ldots, sk\}$;
$Pj=\{p0, p1, p2, \ldots, pk\}$;
$Oj=\{00, 01, o2, \ldots, ok\}$.

12. A context-based co-operative learning method, comprising:
   identifying and indexing objects in accordance with pre-determined parameters of identification and indexing, using an identifier;
   defining parameters of identification in order to determine context topic and/or context theme of the objects based on identifiable features of the objects, using a context determinator;
   gathering sources of information in relation to or with reference to the identified objects, using an information sources gatherer;
   searching for the objects, in response to at least a user query, within the determined context topic and/or the determined context theme, using a searcher;
   building clusters of relevant objects and further adapted to build at least a cluster library based on pre-defined parameters of clustering the clusters, using a cluster data builder;
   mapping at least a context of the query for the searcher with the clusters from the cluster library to segregate and poll the objects in response to the search query in line with at least a determined context topic and/or the determined context theme, using a context mapper; and
   allowing multiple systems to co-operatively learn from each other based on determined context topic and/or determined context theme, using a co-operative learner.

13. The method of claim 12, wherein the identifying and indexing objects includes,
   establishing contextual/thematic features for the objects,
   identifying key features in sad objects, which key features relate to a theme, and
   identifying relationships among identified key thematic features per object.

14. The method of claim 12, wherein the defining parameters of identification includes determining a topic with a topic determinator based on at least one of,
   an association among key phrases that leads to a context,
   occurrence of bigrams, trigrams, relationship and occurrence of key words and phrases, and
   relation extraction between the occurrences.

15. The method of claim 12, wherein the defining parameters of identification includes determining a topic with a topic determinator based on at least one of,
   top frequency unigrams,
   top frequency bigrams,
   longer key phrases,
   an association among frequently occurring unigrams and frequently occurring bigrams,
   a corpus of frequent objects and their statistical association leading to most relevant pre-known topics,
   a likelihood and reinforcement learning mechanisms in order to learn a new topic if there is no pre-known relevant topic,
   semi-supervised learning mechanisms in order to learn a new topic, and
   a mapping of key phrases to a pre-known or learnt topic.

16. The method of claim 12, wherein the defining parameters of identification includes defining a theme using a theme determinator based on an extracted parameter from a set of identified objects, wherein the extracted parameter includes at least one of,
   a local score of words that is computed,
   a global score of words, that is computed, based on similarity,
   a sentence score, that is computed, based on local score, global score, and normalization, and
   a situation representing primary context.

17. The method of claim 12, wherein the gathering sources of information includes gathering information from at least a relation extractor, a name entity recognizer, and a situation builder to build a context.

18. The method of claim 12, wherein the searching for the objects includes searching for the objects within the theme-clustered objects or the topic-clustered objects depending on a user query with the searcher.

19. The method of claim 12, further comprising:
ranking searched the objects, the ranking being determined in accordance with reference to user context topic or context theme.

20. The method of claim 12, wherein the defining parameters of identification includes at least one of,
determining context and content based on semantic processing of the identified objects based on the identifiable features of the identified objects,
determining context and content based on syntactic processing of the identified objects based on the identifiable features of the identified objects,
determining a context topic based on topic-based processing of the identified objects based on the identifiable features of the identified objects,
determining at least a topic that is a representative context of textual content of the identified objects.

* * * * *